United States Patent
Shen et al.

(10) Patent No.: US 6,266,815 B1
(45) Date of Patent: Jul. 24, 2001

(54) PROGRAMMABLE ENTERTAINMENT SYSTEM HAVING BACK-CHANNEL CAPABILITIES

(75) Inventors: Konwei Shen, Newport Coast; Peter Borras, Newport Beach; Ton M. Do, Corona, all of CA (US)

(73) Assignees: Sony Corporation, Tokyo (JP); Sony Trans Com Inc., Irvine, CA (US)

( * ) Notice: Subject to any disclaimer, the term of this patent is extended or adjusted under 35 U.S.C. 154(b) by 0 days.

(21) Appl. No.: 09/258,686

(22) Filed: Feb. 26, 1999

(51) Int. Cl.$^7$ .................................................. H04N 7/173
(52) U.S. Cl. .............................................. 725/76; 725/24
(58) Field of Search ................................ 455/2, 6.2, 6.3, 455/5.1, 4.2; 348/2, 1, 8, 12, 13, 7; 345/327; H04N 7/16, 7/173

(56) References Cited

U.S. PATENT DOCUMENTS

| | | | |
|---|---|---|---|
| 5,508,731 | * 4/1996 | Kohorn et al. ............................ | 348/1 |
| 5,854,591 | * 12/1998 | Atkinson ................................... | 348/8 |
| 5,953,429 | * 9/1999 | Wakai et al. .............................. | 348/8 |
| 5,959,596 | * 9/1999 | McCarten et al. ........................ | 345/2 |
| 5,973,722 | * 10/1999 | Wakai et al. .............................. | 348/8 |
| 6,014,381 | * 1/2000 | Troxel et al. ............................. | 348/8 |
| 6,058,288 | * 5/2000 | Reed et al. ............................. | 455/6.3 |

OTHER PUBLICATIONS

International Search Report, PCT/US00/04857, May 16, 2000, 5 pages.

* cited by examiner

Primary Examiner—Chris Grant
(74) Attorney, Agent, or Firm—Blakely, Sokoloff, Taylor & Zafman LLP (57) ABSTRACT

A vehicle entertainment control system having back-channel capabilities to provide an interactive feature for capturing, collecting, and storing passenger response data. In one embodiment, the system includes a system control unit for controlling the devices in the system. The system also includes a back-channel server unit that provides the interactive content to the passengers over the system, capturing and collecting passenger response data via the back-channel. The interactive feature includes display units located throughout a cabin of a vehicle for displaying questions, and a control unit at the passengers' seats. The questions displayed on the display units and the passenger response data are synchronized, and the passenger response data is collected by the server unit. The back-channel is a bi-directional bus that allows passengers to provide passenger response data using the control unit. The back-channel also allows passengers to select and control audio channels and adjust the volume.

17 Claims, 8 Drawing Sheets

PROGRAMMABLE ENTERTAINMENT SYSTEM HAVING BACK-CHANNEL CAPABILITIES

BACKGROUND OF THE INVENTION

1. Field of the Invention

The present invention relates generally to in-flight entertainment control systems, and specifically, to entertainment systems having back-channel capabilities for capturing and collecting passenger response information.

2. Background Information

Over the last few decades, commercial aircraft have become a necessary mode of transportation for personal and business reasons. In order to improve passenger comfort, many commercial airlines have in-flight entertainment systems ("IFES") offering a variety of services including music, news, movies, video on demand, and telephone service to passengers right at the passengers' seats with the convenience of individualized control. However, such services are limited to individualized interaction, and do not provide for group interaction.

Moreover, airline companies or other common carriers typically hand out questionnaires requesting passenger comments regarding their travel experience including questions on service, food, comfort, etc. The responses to the questionnaires provide feedback to the airline companies and/or common carriers, and plays an important role in improving the quality of service provided. Consequently, it is desirable to provide a mechanism for facilitating the administration of surveys, and collection of responses in an efficient manner.

SUMMARY OF THE INVENTION

The present invention comprises a control sequence and corresponding system for an in-flight entertainment system. In one embodiment, the control sequence includes transmitting a first command by a controller to a server, transmitting a video signal to the controller for displaying the video signal over a plurality of display units, and detecting, by each of a plurality of control units, passenger response data and transmitting the passenger response data to intermediate devices. The control sequence further includes transmitting a second command by the server to the controller for collection of data, transmitting a third command by the controller to the plurality of intermediate devices for the passenger response data, and transmitting the passenger response data collected from the intermediate devices to the server.

DETAILED DESCRIPTION

The present invention is a vehicle entertainment control system having backchannel capabilities to provide an interactive feature for capturing, collecting, and storing passenger response data. The system includes a system control unit for controlling the devices in the system. The system also includes a back-channel server unit that serves as the interactive content to the passengers over the system, capturing and collecting passenger response data via the back-channel. The interactive feature includes display units located throughout the cabin of a vehicle for displaying questions, and a control unit at the passengers' seats, allowing passengers to provide inputs in response to the questions, such that the questions and answers are synchronized. The back-channel is a bidirectional bus that allows passengers to provide passenger response data using the control unit. The backchannel also allows passengers to select and control audio channels and adjust the volume.

In one embodiment, the vehicle entertainment system is implemented during in-flight. As discussed herein, a "vehicle" may include, but is not limited or restricted to, an aircraft, train, ferry, bus, or any other mode of mass transit. In another embodiment, the entertainment system may be used in any setting where there is an audience such as, for example, at a movie theatre. For clarity, the present invention will be described during implementation within a commercial aircraft.

Throughout the detailed description, a number of illustrative embodiments are described in order to convey the spirit and scope of the present invention. While numerous specific details are set forth to describe the preferred embodiment of the invention, such details may not be required to practice the present invention.

Figure 1:
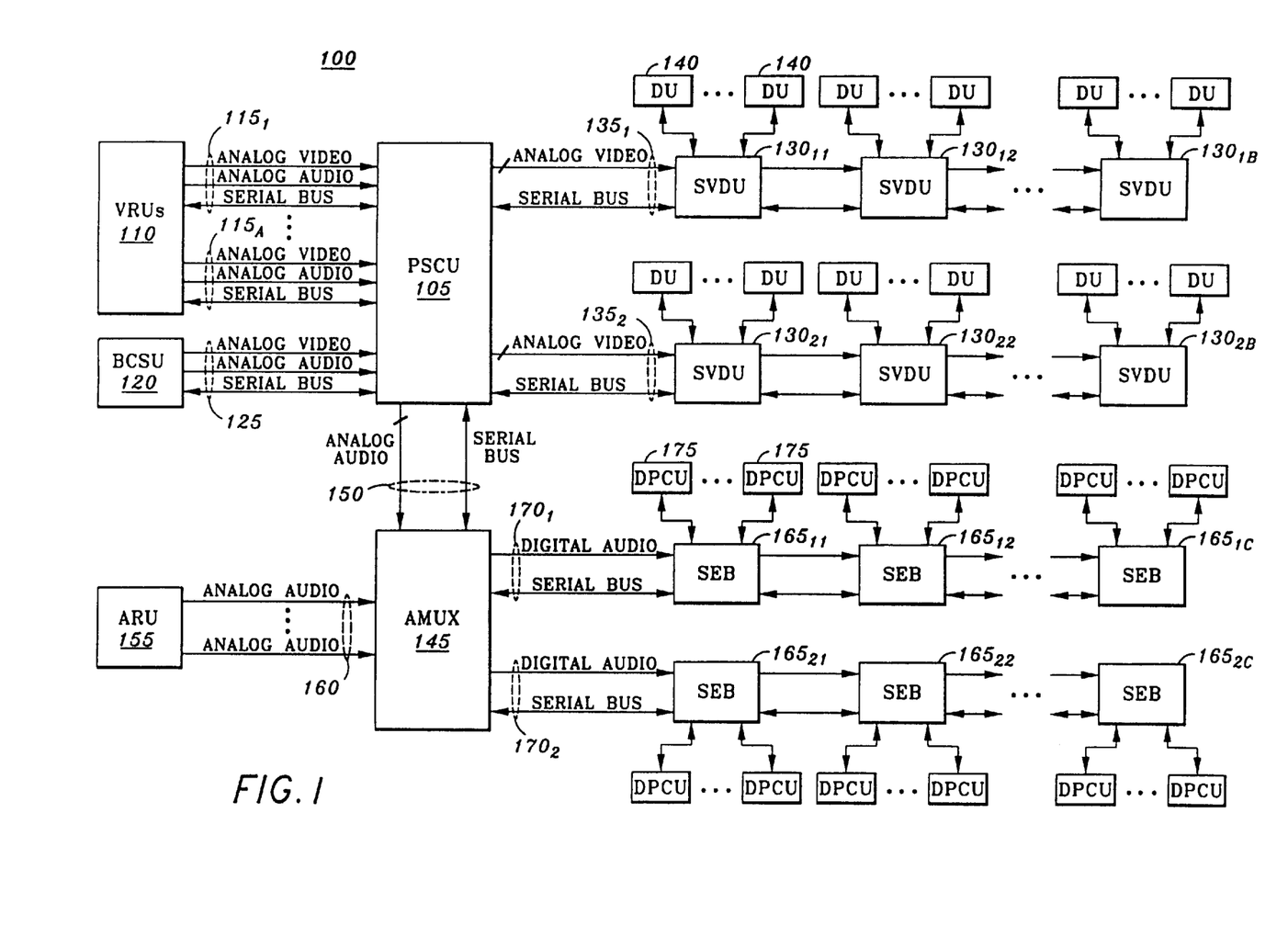
FIG. 1 illustrates a block diagram of a programmable audio/video entertainment system according to one embodiment of the present invention.

FIG. 1 illustrates a block diagram of a programmable audio/video entertainment system ("PAVES") 100 according to one embodiment of the present invention. Referring to FIG. 1, the PAVES 100 includes a Programmable System Control Unit ("PSCU") 105 which is the main control unit for the distribution of audio and video signals throughout the system 100. The PSCU 105 is coupled to a plurality of Video Reproducer Units ("VRUs") 110 by way of respective plurality of communication lines $115_1$–$115_A$ (where "A" is a positive whole number). Each VRU 110 is a VCR type device which plays programming such as movies, cartoons, safety videos, and the like. Each of the communication lines 115 coupled between a VRU 110 and the PSCU 105 includes analog audio and video signal lines, and a bidirectional serial bus. Each VRU 110 generates analog audio and video (e.g., Hi8™) signals which the PSCU 105 distributes in the system. The PSCU 105 controls the VRUs by transmitting commands (e.g., play, stop, pause, rewind, fast-forward, etc.) to the same and obtaining status information via the serial bus.

The PAVES 100 further includes a back-channel server unit ("BCSU") 120, which is coupled to the PSCU 105 via communication lines 125 including analog audio and video signal lines, and a serial bus. The BSCU 120 is a computer that serves as the interactive content of the system. The BSCU 120 generates recorded video and audio signals which are distributed in the system 100 for capturing, collecting, and storing passenger response data, in response to commands from the PSCU 105 over the serial bus. It must be noted that in an alternative embodiment (not shown), the BCSU 120 may be contained entirely within the PSCU 105 such that the PSCU 105 provides the interactive content for the system.

The PSCU 105 is coupled to first and second columns of Smart Video Distribution Units ("SVDUs") $130_{11}$–$130_{1B}$ and $130_{21}$–$130_{2B}$ ("130"), where "B" is a positive whole number, by way of respective communication lines $135_1$ and $135_2$. Although two columns of SVDUs are shown, more or less columns may be provided. Each of the communication lines 135 includes one or more analog video signal lines and a serial bus. The one or more analog video signal lines carry video signals from the PCSU 105 to the plurality of SVDUs. The serial bus is a multi-drop communication topology, allowing SVDUs 130 to be coupled in a daisy-chained fashion. Each SVDU 130 is assigned a unique address. The PSCU 105 controls each SVDU 130 by transmitting commands to the same via the serial bus. Each SVDU 130 is coupled to one or more display units ("DUs") 140 for distributing video signals to the DUs 140. The display units may each be a cathode ray tube, liquid crystal display, or other types device, or a combination of such devices. In the embodiment shown, two DUs 140 are coupled to each SVDU 140 for illustration purposes only, as more than two DUs 140 may be coupled to a SVDU. The DUs 140 are placed throughout the aircraft for viewing by passengers.

For example, in an aircraft, SVDUs $130_{11}$ and $130_{21}$ are placed in first class, SVDUs $130_{12}$ and $130_{22}$ are placed in business dass, and SVDUs $130_{1B}$ and $130_{2B}$ are placed in coach. Each of the communication lines $135_1$ and $135_2$ then includes three signals lines having three video signals thereon, namely, a zone 1, zone 2, and zone 3 video signals. The PSCU 105 then transmits commands to (i) SVDUs $130_{11}$ and $130_{21}$ to display the zone 1 video signal, (ii) SVDUs $130_{12}$ and $130_{22}$ to display the zone 2 video signal, and (iii) SVDUs $130_{1B}$ and $130_{2B}$ to display the zone 3 video signal.

The PSCU 105 is also coupled to an Audio Multiplexer ("AMUX") 145 by way of communication lines 150. The AMUX 145 is an audio distribution multiplexer and a data collection device for the system 100. The PSCU 105 transmits analog audio signals, received from the VRUs 110 and/or the BCSU 120, to the AMUX 145 for distribution of audio signals in the system. There are at least as many audio signal lines on the communication lines 150 as there are video signal lines on communication lines 135. For example, if the communication lines 135 include three analog signal lines, then the communication lines 150 will include at least three corresponding analog audio signal lines. The communication lines 150 will also include analog audio signal lines having audio signals thereon generated and transmitted to the PSCU 105 from the BCSU 120. The communication lines 150 further includes a bidirectional serial bus, allowing the PSCU 105 to send commands to and receive data and status from the AMUX 145, as will be described in more detail below.

The PAVES system 100 further includes an Audio Reproducer Unit ("ARU") 155 that generates and transmits a plurality of analog audio signals (e.g., music, news, etc.) on signal lines 160 to the AMUX 145 for distribution in the system 100. In one embodiment, the ARU 155 is a device that includes a number of tape cassette players, compact disk players, etc., or a combination of such devices.

The AMUX 145 is coupled to first and second columns of Seat Electronics Boxes ("SEB") $165_{11}$–$165_{1C}$ and $1652_{21}$–$165_{2C}$ ("165"), where "C" is a positive whole number, by way of respective communication lines $170_1$ and $170_2$. Only two columns are shown for sake of illustration, as more or less columns may be provided. Each of the communication lines 170 includes an audio signal bus and a serial bus. The serial bus is a multi-drop communication topology. Each SEB 165 has a unique address such that the AMUX 145 can transmit commands to individual SEBs by way of the serial bus. Each SEB 165 is coupled to one or more Digital Personal Control Units ("DPCUs") 175, which are located at each seat, for distributing audio signals to and collecting response data from passengers.

Figure 2:
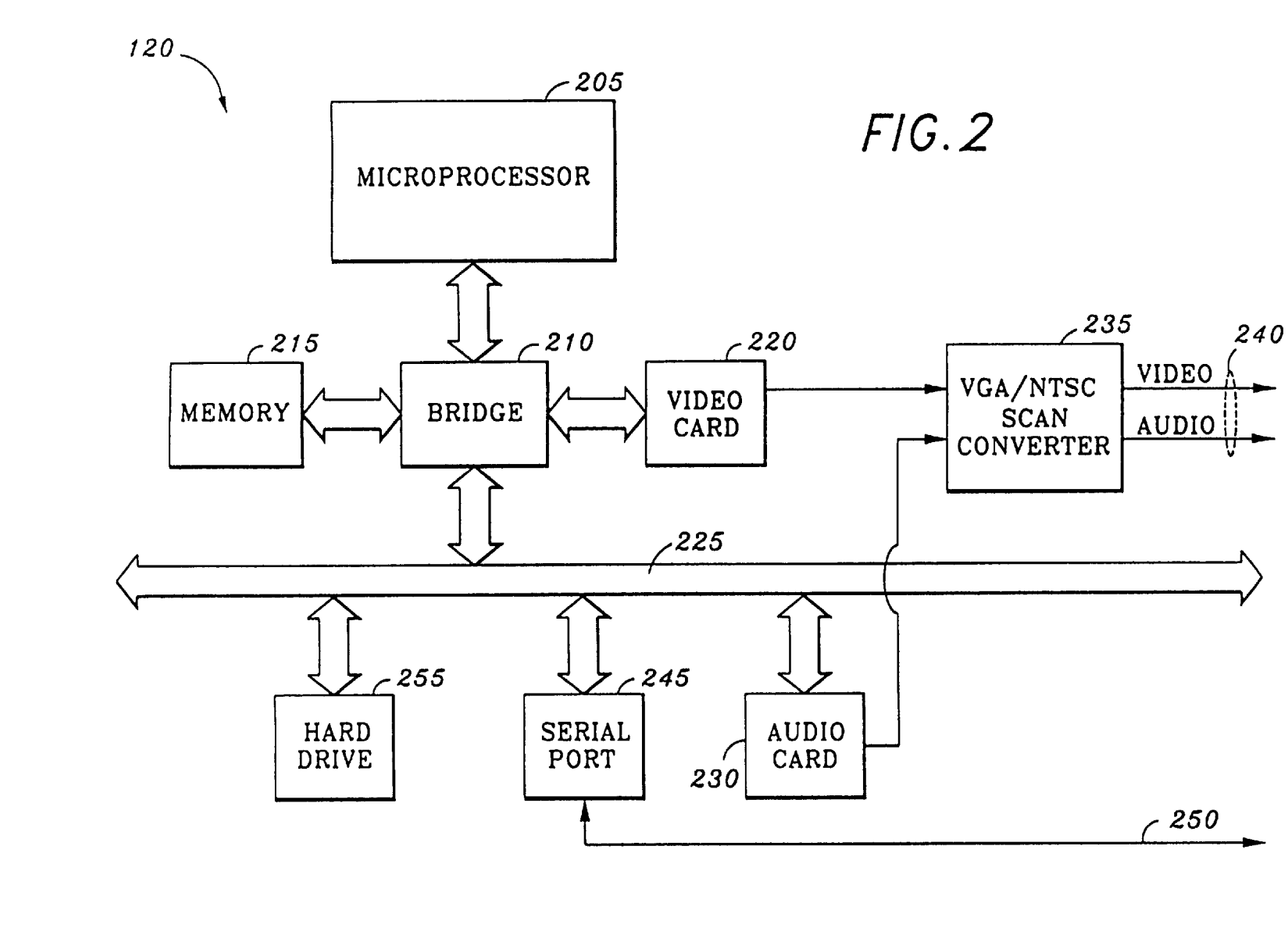
FIG. 2 illustrates a block diagram of a back-channel control unit according to one embodiment of the present invention.

FIG. 2 illustrates a block diagram of a BCSU 120 according to one embodiment of the present invention. The BCSU 120 is a computing device that serves as the interactive content to the passengers over the PAVES 100, and captures and collects passenger response data using the back-channel, as will be described in more detail below.

Referring to FIG. 2, the BSCU 120 includes a microprocessor 205 that is coupled to a memory 215 (e.g., random access memory "RAM", read only memory "ROM", etc.), a video card 220, and a system bus 225 through a bridge 210. Coupled to the system bus 225 include a hard disk drive 255, a serial port 245 (e.g., a universal asynchronous receiver/transmitter), and an audio card 230. In one embodiment, the serial port 245 is an EIA RS-485 compatible interface capable of two wire half duplex operation over a single differential set of shared transmit and receive lines. The serial port 245 is coupled to the PSCU 105 (FIG. 1) by way of serial bus 250.

The video card 220 is a video graphics adapter ("VGA") or similar interface card that generates VGA compatible video signals (RGB and Horizontal and vertical sync signals). The output of the video card 220 is provided to a VGA/Networking and Telecommunication Standing Committee ("NTSC") scan converter ("SNSC") 235 which converts the VGA signal to NTSC outputs (single ended balanced composite video output, differential composite video output, and balanced Y and C video outputs). The audio card 230 is a SoundBlasterm type or similar audio card. The output of the audio card 230 is also coupled to the SNSC 235 which in turn generates two channels of balanced audio signals. The video and audio outputs of the SNSC 235 are coupled to the PSCU 105 by way of signal lines 240 for distributing the signals in the system.

The hard disk drive 255 includes prerecorded audio and video files for transmitting to the audio and video cards 230 and 220, respectively, in response to a same or survey command from the PCSU 105. For example, each video file may corresponds to one question to be displayed on the display units 140 (FIG. 1). For a trivia game, a collection of video files include trivia-type questions that are sequentially distributed over the DUs 140 (FIG. 1) allowing passengers to respond, in a synchronized manner, to the multiple-choice type questions within a predetermined time using the DPCUs 175 at their seat. The BCSU 120 then collects the passenger response data (e.g., in memory 215) and maintains scores for each seat (i.e., passenger). At the end of the game, a winner is declared and the seat number is displayed over the DUs 140. Another type of interactive content is a survey where passengers can respond, electronically, to survey type questions, which the BCSU 120 collects for the common carrier.

Figure 3:
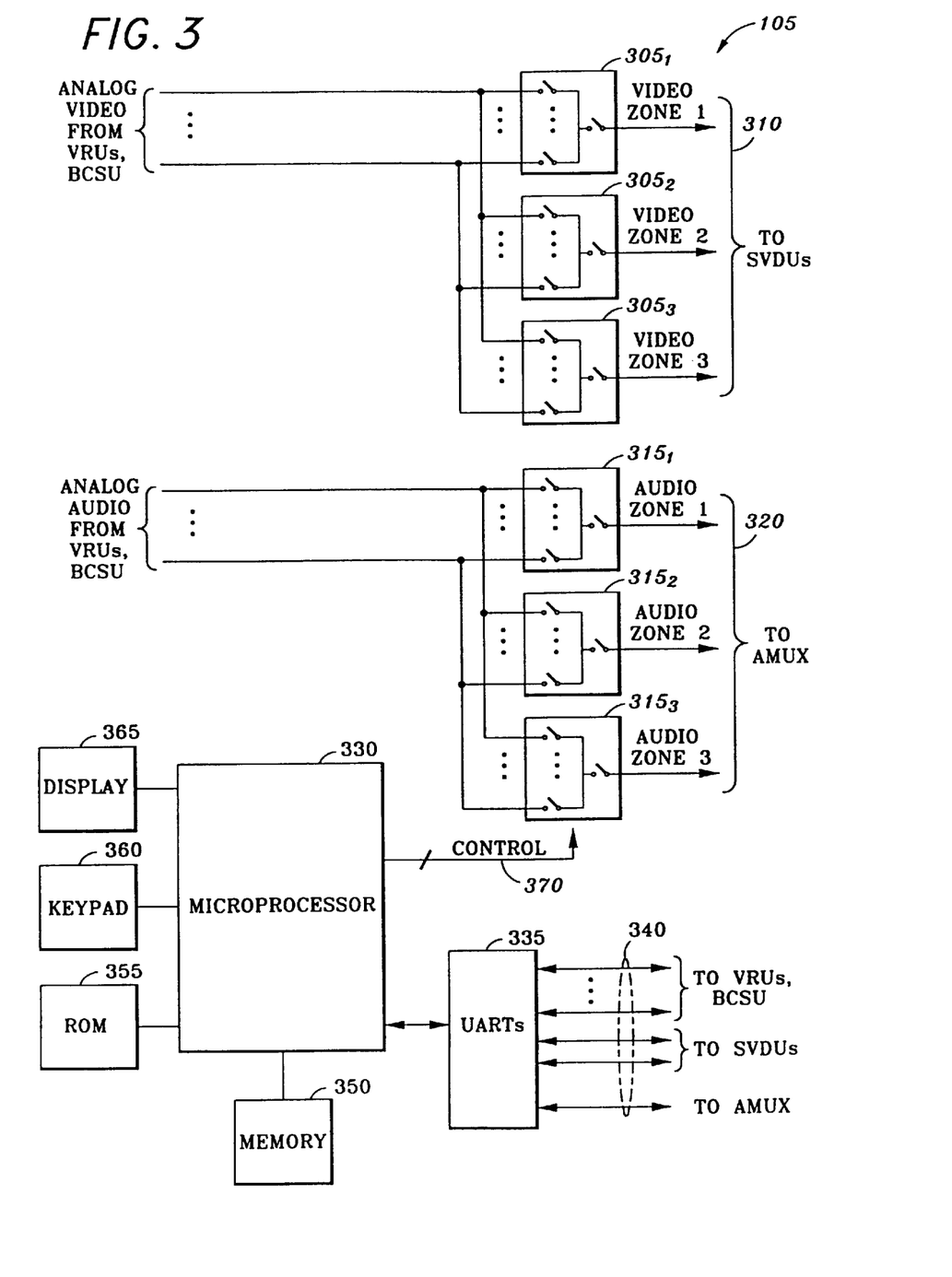
FIG. 3 illustrates a block diagram of the programmable system control unit, according to one embodiment of the present invention.

FIG. 3 illustrates a block diagram of the programmable system control unit 105, according to one embodiment of the present invention. Referring to FIG. 3, the PSCU 105 includes analog multiplexers ("muxs") $305_1$–$305_3$ ("305")

each including a plurality of inputs and a single output. The analog video signals from the VRUs 110 on communication lines $115_1$–$115_A$ and/or the BCSU 120 on communication lines 125 are coupled to the inputs of each mux 305. The output of the muxs $305_1$–$305_3$ are the zone 1, zone 2, and zone 3 analog video signal lines 310, which are coupled to the SVDUs 130 (FIG. 1). The PSCU 105 then controls the SVDUs 130 to display one of the analog video signals on its local DUs 140. The PSCU 105 further includes analog muxs 315₁–315₃ each of which includes a plurality of inputs and a single output. The analog audio signals from the VRUs 110 on communication lines $115_1$–$115_A$ and/or the BCSU 120 on communication lines 125 are coupled to the inputs of each mux 315. The output of the muxs $315_1$–$315_3$ are the zone 1, zone 2, and zone 3 analog audio signal lines 320, which are coupled to the AMUX 145. Note here that more or less than three analog video muxs $305_1$–$305_3$ and/or analog audio muxs $315_1$–$315_3$ may be provided.

The PCSU 105 further includes a microprocessor 330 which is the central processing and control unit of the PCSU, a UART 335, memory 350, program memory 355 (e.g., ROM), keypad 360, and a local display 365. The microprocessor 330 controls the video muxs $305_1$–$305_3$ and audio muxs $315_1$–$315_3$ by way of control signal lines 370. More specifically, the microprocessor 330, in response to software program control, determines the outputs of the video and audio muxs. The microprocessor is coupled to the UART 335 for transmitting and receiving commands over a plurality of serial busses 340 to the various devices in the system. In particular, the serial busses 340 allows the microprocessor 330 to communicate with the VRUs 110 to control the video programming to be played, the SVDUs 130 to control the video source that the DUs are to display, and the AMUX 145 to send commands and receive data and status information.

A cabin attendant operates the PCSU 105 by way of the keypad 360 and display 365. Such information as number of zones, number of SVDUs per zone, number of SEBs, audio channels, audio levels, and the like is pre-programmed in the PCSU 105. For example, various configuration setting may be programmed in the ROM 355 or downloaded into memory 350 by way of an I/O port (not shown). However, an attendant may change these parameters by way of the keypad 360. In one embodiment, the PCSU 105 provides three main modes of operation. The first mode includes an auto mode which automates the sequencing of video programs, minimizing cabin attendant involvement. The second mode involves an all zones manual mode where the cabin attendant is allowed to control the video system using a minimum amount of effort. A first button on the keypad 360 turns on all DUs 140 (FIG. 1) while a second button on the keypad selects the video source (e.g., VRU Number, BCSU, etc.) to be shown on all DUs 140. That is, zones can be controlled by assigning video sources to zones, turning zones on or off, etc., and individual DUs can be controlled. The VRUs 110 and BCSU 120 can be controlled (Stop, Play, Fast Forward, and Rewind) on the keypad 360. The third mode is a manual control mode which allows a cabin attendant to manually control the PCSU 105. In this mode, a menu is shown on the display 365 prompting the attendant through the actions required to turn on the DUs 140 and select the video source for each zone.

Figure 4:
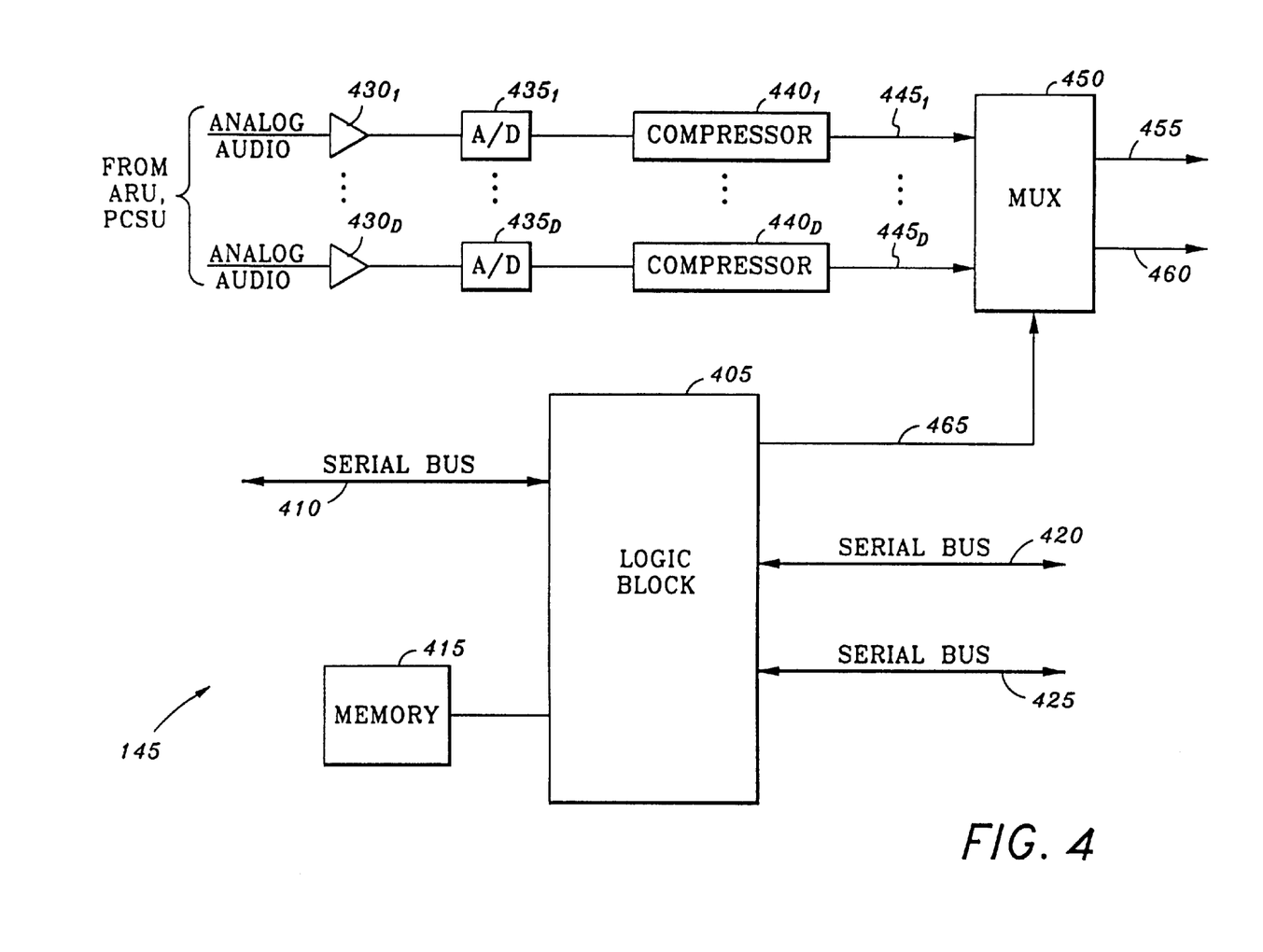
FIG. 4 illustrates a block diagram of the audio multiplexer according to one embodiment of the present invention.

FIG. 4 illustrates a block diagram of the audio multiplexer 145 according to one embodiment of the present invention. Referring to FIG. 4, the AMUX 145 includes a control logic block 405, which may be a microprocessor, microcontroller, or combination logic, and a memory 415. The logic block 405 is coupled to the PCSU 105 (FIG. 1) by way of serial bus 410. The PCSU 105 transmits commands to the logic block 405, and the logic block transmits the commands to the SEBs 165 (FIG. 1) by way of serial busses 420 and 425. Serial bus 420 is coupled to the first column of SEBs $165_{11}$–$165_{1C}$ whereas serial bus 425 is coupled to the second column of SEBs $165_{21}$–$165_{2C}$. More specifically, the PSCU 105 transmits a command to the AMUX 145 requesting data. In response, the AMUX 145 transmits a request for passenger response data to the SEBs 165. The AMUX 145 then transmits the passenger response data, received from the SEBs 165, to the PSCU 105.

The analog audio signals on communication lines 160 from the ARU 155 and the analog audio signals on communication lines 150 from the PCSU 105 are coupled to the inputs of respective line drivers $430_1$–$430_D$ (where "D" is a positive whole number). The line drivers $430_1$–$430_D$ are coupled to respective analog-to-digital converters $435_1$–$435_D$ which convert the analog audio signals to digital data (e.g., sixteen-bit resolution). The analog-to-digital converters $435_1$–$435_D$ are coupled to respective compressors $440_1$–$440_D$ which compress the digital data using a compression algorithm. The compressed digital data at the outputs of compressors $440_1$–$440_D$ are sent to a mux 450 by way of signal lines $445_1$–$445_D$. The mux 445 then merges the encoded and compressed digital data on signal lines $445_1$–$445_D$ (channels) into a single pulse code modulation ("PCM") data stream and broadcasts the PCM data stream to all SEBs 165 by way of digital audio signal lines 455 and 460. In particular, digital audio bus 455 broadcasts the PCM data stream to the first column of SEBs $165_{11}$–$165_{1C}$ and digital audio bus 460 broadcasts the PCM data stream to the second column of SEBs $165_{21}$–$165_{1C}$. The logic block 405 controls the mux 450 by way of signal line 465.

In one embodiment, each serial bus discussed herein conforms to the Electronics Industry Association standard RS-485 bus for multipoint communications. However, any other type of bus may be used such as a universal serial bus "USB", a 1394 serial bus, IEEE 1394-1995 High Performance Serial Bus IEEE, Published in 1995, IEEE 429 type bus, an Ethernet-type bus, etc., or a combination of such busses.

Figure 5:
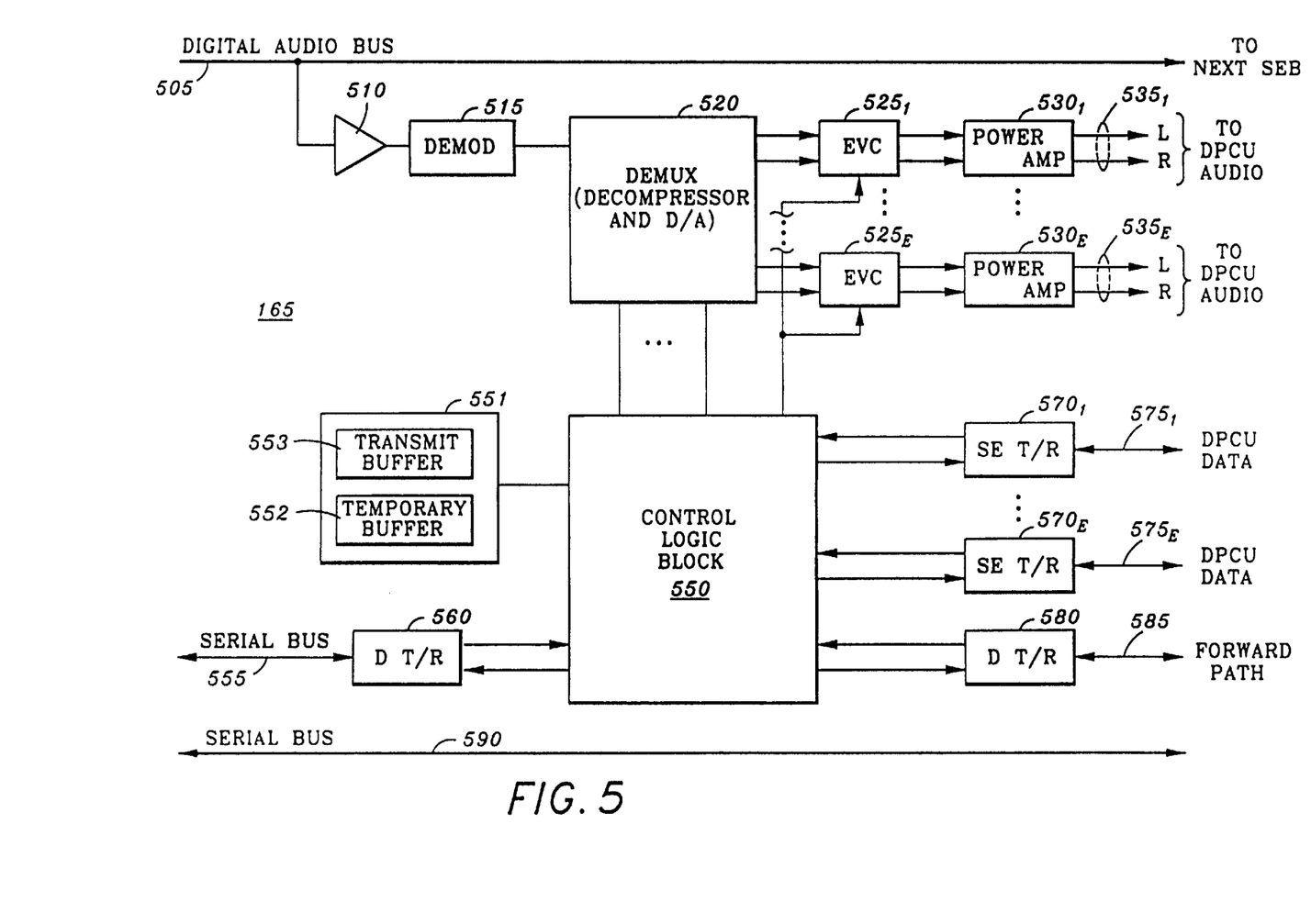
FIG. 5 illustration a block diagram of the seat electronic box according to one embodiment of the present invention.

FIG. 5 illustration a block diagram of the seat electronic box 165 according to one embodiment of the present invention. Referring to FIG. 5, the SEB 165 includes a control logic block 550, which may be a microprocessor, microcontroller, or combinational logic circuit, and a memory device 551 having contained therein at least a temporary buffer 552 and a transmit buffer 553. The SEB 165 further includes a buffer 510 which feeds the PCM data stream on the digital audio bus 505 to a demodulator 515. The demodulator 515 demodulates the PCM data stream and forwards the compressed digital audio data to a demultiplexer 520. The demultiplexer 520 decompresses and coverts the digital audio of two or more channels into analog form, responsive to inputs controlled by the control logic block 550. For example, if three DPCUs 175 are coupled to the SEB 165, then six channels are decompressed and converted into analog audio to form three stereo pairs.

The control logic block 550 is coupled to a plurality of single-ended transceivers $570_1$–$570_E$, which are in turn coupled to corresponding plurality of DPCUs 175 (FIG. 1) by way of bi-directional serial bus lines $575_1$–$575_E$. The control logic block 550 transmits commands to and receives commands and data from each DPCU 175. In particular, the logic block 550 receives channel up/down and volume up/down commands, and passenger response data from and transmits channel ID commands to the DPCUs 175 by way of the lines $575_1$–$575_E$. In response to the channel up/down commands from the DPCUs, the control logic block 550 controls the demultiplexer 520 to select, decompress, and convert to analog form two channels forming a stereo pair for each DPCU according to the passenger's choice. The analog stereo signals are coupled to respective electronic volume control ("EVC") blocks $525_1$–$525_E$. The control logic block 550 adjusts the volume of the stereo signals in response to the volume up/down commands received. The analog stereo signals are then fed to respective power amplifiers $530_1$–$530_E$ which amplify the signals. Each stereo signal pair (left and right channels) are transmitted to the respective DPCUs by way of signal lines $535_1$–$535_E$. The control logic block 550 is coupled to a differential transceiver 560, which is in turn coupled to the AMUX 145 (FIG. 1) by way of a serial bus 555. The control logic block 550 is also coupled to a second differential transceiver 580, which is coupled to a next SEB by way of serial bus 585.

Passenger response data received from the DPCUs over the signal lines $575_1$–$575_E$ are placed in the temporary buffer 552. In response to a command received from the PSCU 105 to collect data, the AMUX 145 broadcasts a command to each SEB 165 to "freeze" the passenger response data already collected, if any. As a result, each SEB 165 then moves the passenger response data collected in the temporary buffer 552 to the transmit buffer 553 for transmission to the AMUX 145. Each SEB 165 then places any subsequent passenger response data (e.g., response to a subsequent question) in the now-empty temporary buffer 552. Upon request, the data in the transmit buffer 553 is transmitted to the AMUX 145 via the serial bus 555. Also included with each passenger response data is a DPCU identification number (e.g., seat number) identifying the response data with the seat.

Figure 6:
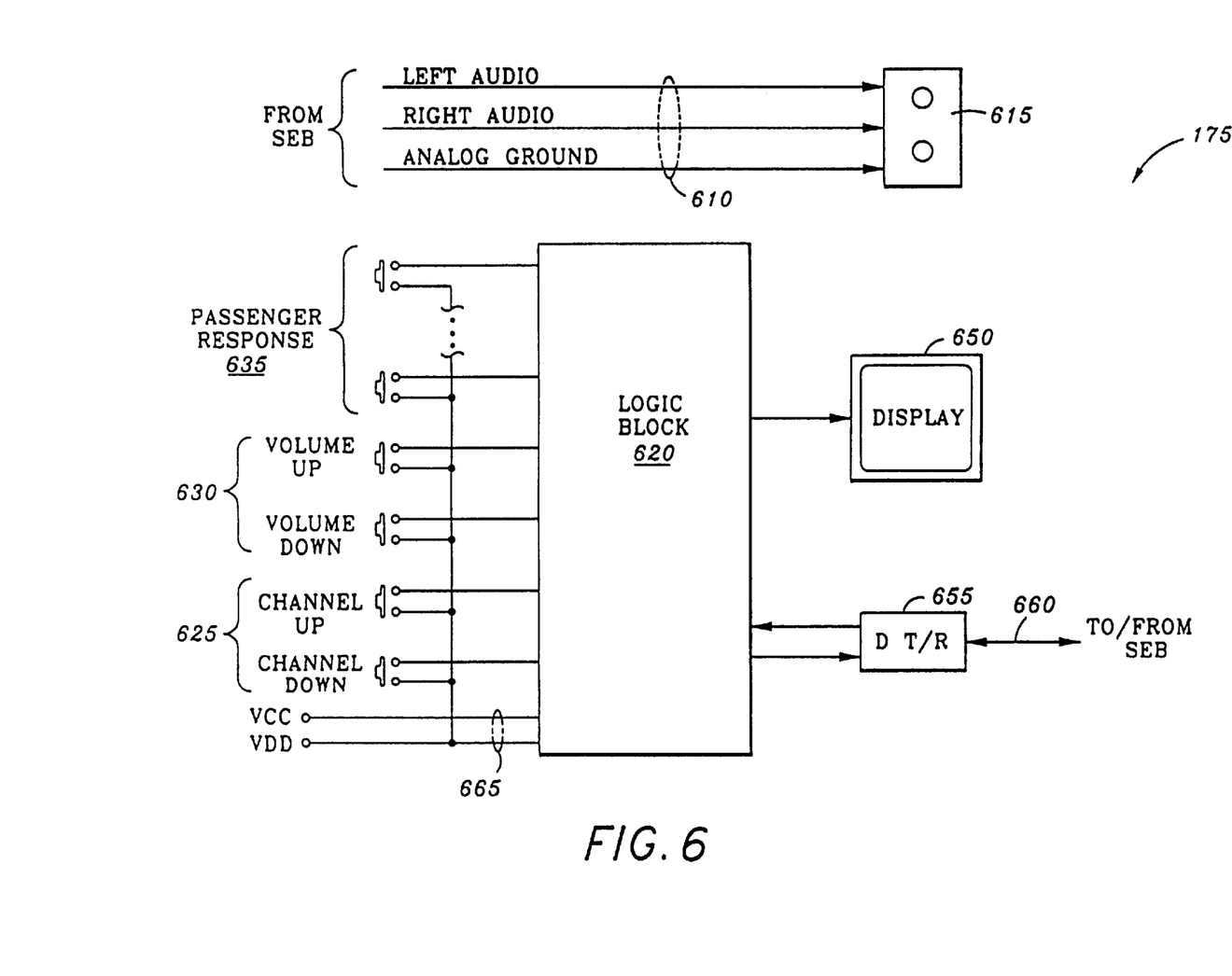
FIG. 6 illustrates a block diagram of a digital personal control unit according to one embodiment of the present invention.

FIG. 6 illustrates a block diagram of a digital personal control unit 175 according to one embodiment of the present invention. A DPCU 175 is located at each seat to allow each passenger to respond to questions displayed over the DUs 140 (FIG. 1). The DPCU 175 also allows passengers to listen to and control the volume of various audio programming (e.g., music, news, etc.). Referring to FIG. 6, the DPCU 175 receives left and right audio signals from the SEB 165 on signal lines 610. The audio signals are coupled to a headphone jack 615, allowing a passenger to listen to the audio programming. The DPCU 175 includes a logic block 620 which may be implemented using a microprocessor or microcontroller and memory, or combinational logic circuitry. Two volume buttons 630 (volume up and volume down) and two channel buttons 625 (channel up and channel down) are coupled to the logic block 620. In addition, a plurality of passenger response buttons 635 are coupled to the logic block 620 for detecting passenger responses to questions displayed on the DUs 140 (FIG. 1). The logic block 620 is coupled to a display 650 (e.g., seven segment LED, liquid crystal display, etc.) which displays the channel number and volume level. The logic block 620 is also coupled to a differential transceiver 655, which is in turn coupled to the local SEB 165 by way of serial bus 660. The DPCU 175 also includes power and ground signals 665.

When any of the volume buttons 630, channel buttons 625, and/or passenger response buttons 635 are pressed, the logic block 620 detects the button(s) pressed and, in real time, sends corresponding commands and/or data to the local SEB 165. For example, if a channel up button is pressed, the logic block 620 detects the pressing of the button and transmits a channel up command to the SEB. The control logic block 550 of the SEB will control the demultiplexer 520 to decompress and convert the appropriate channels for transmission to the DPCU 175. The control logic block 550 also transmits the channel ID back to the logic block 620 which displays the (new) channel number on the display 650.

Figure 7A:
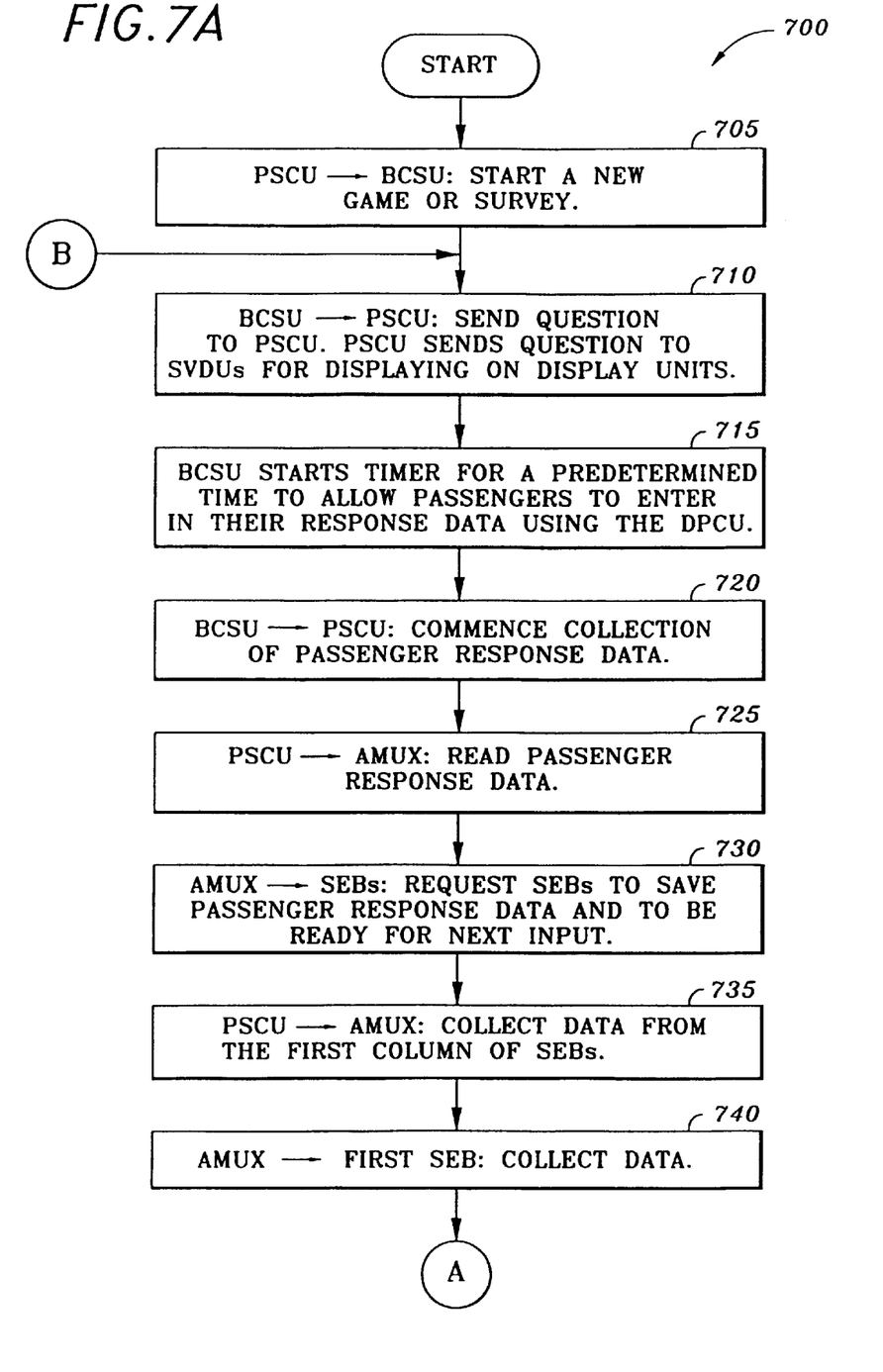
FIG. 7 illustrates a flow diagram of a control sequence for collecting passenger response data according to one embodiment of the present invention.
Figure 7B:
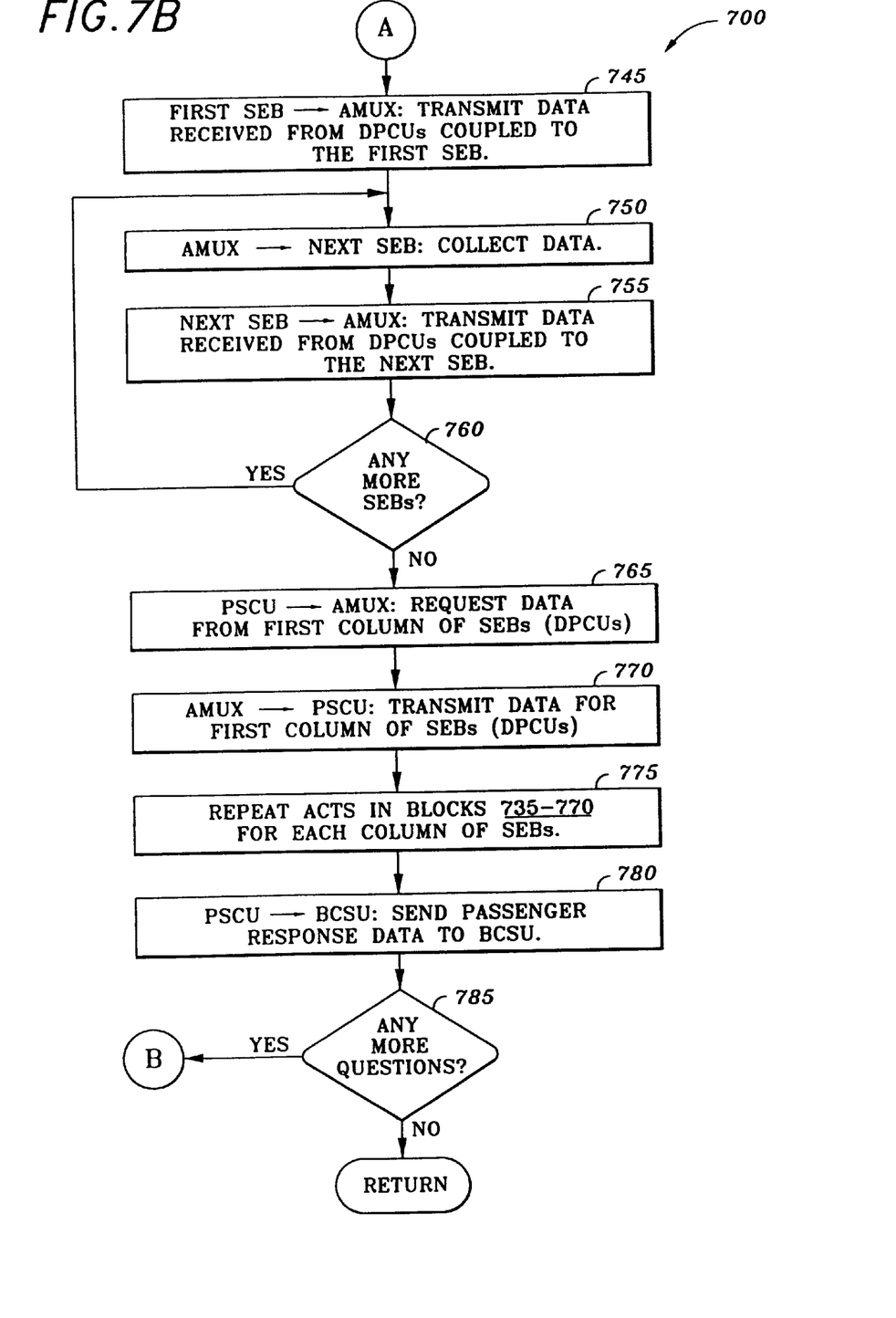

FIG. 7 illustrates a flow diagram of a control sequence 700 for collecting passenger response data according to one embodiment of the present invention. Referring to FIGS. 1 and 7, the control sequence 700 commences at block 705 where the PSCU transmits a command to the BCSU to start a new game or survey. At block 710, the BCSU commences the game or survey by transmitting a video signal of a question to the PSCU, which the PSCU transmits to the SVDUs for displaying the question on the display units to passengers. At block 715, the BCSU waits for a predetermined amount of time (e.g., 16 seconds) to allow the passengers to read the question and provide an answer using their DPCU. After the predetermined amount of time has passed, at block 720, the BCSU transmits a command to the PSCU to commence collecting the passenger response data to the question. This allows the BCSU (and PSCU) to synchronize the answers to the questions. In response, at block 725, the PSCU transmits a command to the AMUX to request the passenger response data. At block 730, the AMUX broadcasts a command to all the SEBs requesting for the SEBs to transmit the passenger response data already collected (in a transmit buffer in memory), and instructing the SEBs to start storing passenger response data (in a temporary buffer) for a next question.

At block 735, the PSCU transmits a command to the AMUX requesting that the latter collect the passenger response data from the first column of SEBs (i.e., $165_{11}$–$165_{1C}$). At block 740, the AMUX transmits a command to a first SEB for the data, with the latter, at block 745, transmitting the passenger response data collected from its local DPCUs (if any) to the AMUX. At block 750, the AMUX then transmits a command to a next SEB for the data, and the next SEB provides the passenger response data to the AMUX (block 755). At block 760, a determination is made as to whether there are any more SEBs in the first column. If there is another SEB in the first column, the control sequence 700 moves to block 750, were the acts blocks 750 and 755 are performed. If the data has been collected from all SEBs in the first column, the control sequence continues to block 765. At block 765, the PSCU transmits a command to the AMUX requesting the passenger response data collected from the first column of SEBs, if any. In response, at block 770, the AMUX transmits the data to the PSCU. At block 775, the acts in blocks 735 to 770 are performed for each column of SEBs. At block 780, after collecting the passenger response data from the SEBs, the PSCU transmits the passenger response data to the BCSU. At block 785 a determination is made as to whether there are any more questions. If there are, the control sequence 700 moves to block 710 to commence synchronization of displaying a next question and collecting the data in response thereto. Otherwise, the control sequence 700 ends.

The system's unique "back-channel" capability offers an enriched form of on-board entertainment and data collection. In one application, the system may be used to provide interactive trivia gates that tests the passengers knowledge on various topics. The passengers can check their score and rate their score against other passengers. This new level of entertainment lends itself to special airline promotions (e.g., top score wins 500 frequent flyer miles). The back-channel capabilities also allows the system to conduct surveys to determine demographic information, passenger opinions regarding service, etc. The scripting of questions may be accomplished by the airline's own marketing department or by a third party.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A control sequence for a passenger entertainment system, comprising:
   transmitting a first command requesting a video signal from a controller to a server;
   transmitting a video signal from the server to the controller for displaying the video signal to passengers on a plurality of display units;
   transmitting the video signal from the controller to the plurality of display units
   detecting, by each of a plurality of control units, passenger response data provided by passengers in response to the video signal;
   transmitting the passenger response data from the control units to intermediate devices;
   transmitting from the server to the controller a second command for collection of data;
   transmitting a third command, from the controller to the intermediate devices for the passenger response data; and
   collecting the passenger response data from the intermediate devices at the controller; and
   transmitting the passenger response data collected from the intermediate devices to the server.

2. The control sequence of claim 1, wherein prior to transmitting a second command by the server to the controller for collection of data, the server waiting a predetermined amount of time.

3. The control sequence of claim 1, wherein transmitting the first command by the controller to the server comprises transmitting the first command by the controller to the server to start a new game.

4. The control sequence of claim 1, wherein transmitting the first command by the controller to the server comprises transmitting the first command by the controller to the server to start a survey.

5. The control sequence of claim 1, wherein prior to transmitting the passenger response data collected from the intermediate devices to the server, each of the plurality of intermediate devices, transmitting the passenger response data, if any, to the controller via a bi-directional serial bus.

6. The control sequence of claim 1 wherein the passengers are aircraft passengers.

7. A passenger entertainment system, comprising:
   a plurality of display devices;
   a controller coupled to the plurality of display devices, the controller transmitting video signals for display on the plurality of display devices, the controller further transmitting commands to collect passenger response data following the display of a video signal;
   a plurality of control devices each having one or more inputs operable by a passenger for allowing passengers to indicate responses, each of the control devices transmitting passenger response data representing the inputs selected by a passenger;
   a plurality of intermediate devices, each intermediate device coupled to the controller and to a plurality of control devices, the plurality of intermediate devices receiving commands to collect passenger response data from the controller, and responsive thereto, transmitting passenger response data received from the plurality of control units to the controller; and
   a server coupled to the controller, the server providing the video signals to the controller, transmitting commands to the controller to collect passenger response data and receiving passenger response data from the controller.

8. The passenger entertainment system of claim 7 further comprising a multiplexer coupled between the controller and the plurality of intermediate devices.

9. The passenger entertainment system of claim 7 wherein the plurality of intermediate devices are coupled to the controller via a bi-directional serial bus.

10. The passenger entertainment system of claim 7 further comprising a video reproducer unit coupled to the controller, the controller to distribute video programming from the video reproducer unit to the plurality of display units.

11. The passenger entertainment system of claim 8 further comprising an audio reproducer unit coupled to the multiplexer, the multiplexer to distribute audio programming from the audio reproducer unit to the plurality of control devices.

12. The passenger entertainment system of claim 7 wherein the entertainment system is an in-flight entertainment system and the passengers are aircraft passengers.

13. A passenger entertainment system, comprising:
   a plurality of display devices;
   a controller coupled to the plurality of display devices, the controller transmitting video signals for display on the plurality of display devices;
   a plurality of control devices coupled to the controller each having one or more inputs operable by a passenger, each of the control devices transmitting inputs selected by a passenger to the controller;
   a plurality of intermediate devices, each intermediate device coupled to the controller and to the plurality of control devices, the plurality of intermediate devices receiving commands to collect passenger inputs from the controller, and responsive thereto, transmitting passenger inputs received from the plurality of control units to the controller; and
   a server coupled to the controller, the server providing video signals to the controller for transmission to the display devices, the server transmitting commands to the controller to collect, from the control devices, inputs selected by passengers in response to the displayed video and the server receiving the passenger inputs from the controller.

14. The system of claim 13 further comprising a multiplexer coupled between the controller and the plurality of intermediate devices.

15. The improvement of claim 13, wherein the server waits a predetermined amount of time after providing video signals to the controller before transmitting commands to the controller to collect passenger inputs.

16. The improvement of claim 13, wherein the server receives a command from the controller to start a new game and in response provides video signals to the controller for transmission to the display devices.

17. The improvement of claim 13, wherein the server receives a command from the controller to start a survey and in response provides video signals to the controller for transmission to the display devices.

* * * * *